(12) United States Patent
Battle et al.

(10) Patent No.: US 11,194,578 B2
(45) Date of Patent: Dec. 7, 2021

(54) FUSED OVERLOADED REGISTER FILE READ TO ENABLE 2-CYCLE MOVE FROM CONDITION REGISTER INSTRUCTION IN A MICROPROCESSOR

(71) Applicant: International Business Machines Corporation, Armonk, NY (US)

(72) Inventors: Steven J. Battle, Austin, TX (US); Brian D. Barrick, Pflugerville, TX (US); Joshua W. Bowman, Austin, TX (US); Susan E. Eisen, Round Rock, TX (US); Brandon Goddard, Kirkland, WA (US); Cliff Kucharski, Austin, TX (US); Dung Q. Nguyen, Austin, TX (US); David S. Walder, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 250 days.

(21) Appl. No.: 15/987,105

(22) Filed: May 23, 2018

(65) Prior Publication Data
US 2019/0361698 A1 Nov. 28, 2019

(51) Int. Cl.
*G06F 9/30* (2018.01)
*G06F 9/38* (2018.01)

(52) U.S. Cl.
CPC .......... *G06F 9/3013* (2013.01); *G06F 9/3836* (2013.01)

(58) Field of Classification Search
CPC .................... G06F 9/30032; G06F 9/30101
See application file for complete search history.

(56) References Cited

U.S. PATENT DOCUMENTS

| | | | | |
|---|---|---|---|---|
| 5,826,070 A * | 10/1998 | Olson | .................. | G06F 9/30094 712/222 |
| 6,021,488 A * | 2/2000 | Eisen | .................. | G06F 9/30101 712/222 |
| 7,111,155 B1 * | 9/2006 | Anderson | ........... | G06F 9/30014 712/208 |
| 10,037,073 B1 * | 7/2018 | Catovic | ................. | G06F 1/3228 |
| 2008/0126744 A1 * | 5/2008 | Moyer | ................ | G06F 9/30043 712/4 |

(Continued)

OTHER PUBLICATIONS

IBM, "mfcr (Move from Condition Register) Instruction", https://www.ibm.com/support/knowledgecenter/ssw_aix_71/com.ibm.aix.alangref/idalangref_mfcr_mcr_instrs.htm, Feb. 1990, 2 pages.

*Primary Examiner* — Jacob Petranek
(74) *Attorney, Agent, or Firm* — Scully, Scott, Murphy & Presser, P.C.

(57) ABSTRACT

A computer system, processor, and method for processing information is disclosed that includes at least one computer processor, a register file associated with the at least one processor, preferably a condition register that stores status information, the register file having multiple locations for storing data, multiple ports to write data to and read data from the register file. The system or processor includes an execution area, and the processor is configured to read from all the read ports in a first cycle, and to read from all the read ports in a second cycle. In an embodiment, the execution area includes a staging latch to store data from a first cycle read operation, and in an aspect the computer system is configured to combine the data stored in the staging latch during a first read cycle with the data read from the second cycle.

18 Claims, 8 Drawing Sheets

(56) References Cited

U.S. PATENT DOCUMENTS

| | | | |
|---|---|---|---|
| 2011/0153990 A1* | 6/2011 | Ottoni | G06F 9/30058 |
| | | | 712/208 |
| 2013/0311754 A1 | 11/2013 | Brown et al. | |
| 2014/0025927 A1* | 1/2014 | Bradbury | G06F 9/30014 |
| | | | 712/204 |
| 2014/0122847 A1* | 5/2014 | Henry | G06F 9/4401 |
| | | | 712/243 |
| 2016/0179542 A1 | 6/2016 | Lai et al. | |
| 2017/0185410 A1 | 6/2017 | Abernathy et al. | |

* cited by examiner

FUSED OVERLOADED REGISTER FILE READ TO ENABLE 2-CYCLE MOVE FROM CONDITION REGISTER INSTRUCTION IN A MICROPROCESSOR

BACKGROUND OF INVENTION

The present invention generally relates to data processing systems, processors, and more specifically to register files in processors.

Processors currently used in data processing systems today may be capable of "super-scalar" operation and may have "pipelined" elements. Such processors typically have multiple elements which operate in parallel to process multiple instructions in a single processing cycle. Pipelining involves processing instructions in stages, so that the pipelined stages may process a number of instructions concurrently.

Typically the processor includes a number of stages, and the various stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue is issued to an execution unit in an "execution" stage. The "execution" stage processes the operation as specified by the instruction. Executing an operation specified by an instruction typically includes accepting data, e.g., one or more operands, and producing one or more results. There are usually register files associated with the execution units and/or the issue queue to hold data and/or information for the execution units.

In modern computer architecture, there are several known ways to design a computer adapted to perform more than one instruction at a time, or at least in the same time frame. For example, such a computer may include more than one processor core (i.e., central processing unit) and each processor core may be capable of acting independently of other processor cores. This may allow for true multitasking, with each processor core processing a different instruction stream in parallel with the other processor cores of the computer. Another design to improve throughput may be to include multiple hardware threads within each processor core, with the threads sharing certain resources of the processor core. This may allow each processor core to take advantage of thread-level parallelism. To handle the multiple threads in each processor core, a processor core may have multiple execution slices. An execution slice may refer to a set of data processing hardware units connected in series within a processor core. An execution slice may be a pipeline or pipeline-like structure. Multiple execution slices may be used as part of simultaneous multi-threading within a processor core.

SUMMARY

The summary of the disclosure is given to aid understanding of a computer system, computer architectural structure, register files, and method of using register files in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, register files, and their method of operation to achieve different effects.

Certain aspects of the present disclosure provide a method of processing data or information in a processor. The method includes in an embodiment reading register file data from multiple read ports in a first cycle, and storing data from the first cycle read into an execution area. The method further includes in an embodiment reading register file data from multiple read ports in a second cycle, and in an aspect, combining register file data from the first cycle with register file data from the second cycle to form combined register file data. In an aspect, the execution area comprises a scratch latch and data from the first cycle is stored in the scratch latch and data from the second cycle is combined with data from the scratch latch in the execution area. In a further aspect, the method includes sending the combined register file data to a target. In an embodiment, the method includes moving the contents of a condition register, which contains status information.

In an embodiment, a computer system for processing information is disclosed. The computer system includes at least one computer processor; a register file associated with the at least one processor, the register file having multiple locations for storing data, multiple ports to write data to the register file, and multiple ports to read data from the register file; and an execution area, and the processor is configured to read from all the read ports in a first cycle, and to read from all the read ports in a second cycle. In an embodiment, the execution area includes a staging latch to store data from a first cycle read operation, and in an aspect the computer system is configured to combine the data stored in the staging latch during a first read cycle with the data read from the second cycle to form combined data. In a further embodiment, the combined data is sent directly to a general purpose register. In an embodiment, the register is a condition register having four read ports and eight entries containing status data. In an embodiment the system is configured to couple multiple read instructions together so that the instructions issue back-to-back to a same execution unit.

In another embodiment, the computer system includes at least one processor; a register file associated with the at least one processor, the register file having multiple locations for storing data, multiple ports to write data to the register file, and multiple ports to read data from the register file; an execution area having a staging latch for storing data; one or more computer readable non-transitory storage media; and programming instructions stored on the one or more computer readable non-transitory storage media for execution by the at least one processor, the programming instructions including programming instructions to read register file data from multiple read ports in a first cycle; and programming instructions to store data read from the first cycle into the staging latch. In an embodiment, the system includes program instructions to read register file data from all read ports in the at least one register file in the first cycle and to read all read ports in the at least one register file in a second cycle, and in an aspect, programming instructions to combine in an execution area register read data from the staging latch with register data read from the register file in a second cycle to form combined data. The processor may further include programming instructions to treat an instruction to move all the contents of the condition register file as multiple read instructions coupled together so that they issue back-to-back to a same execution unit.

BRIEF DESCRIPTION OF THE DRAWINGS

The various aspects, features and embodiments of the computer system, computer architectural structure, register files, and their method of operation will be better understood when read in conjunction with the figures provided. Embodiments are provided in the figures for the purpose of illustrating aspects, features and/or various embodiments of the computer system, computer architectural structure, register files, and their method of operation, but the claims should not be limited to the precise arrangement, structures, features, aspects, embodiments or devices shown, and the arrangements, structures, subassemblies, features, aspects, methods, processes, embodiments, methods, and devices shown may be used singularly or in combination with other arrangements, structures, subassemblies, features, aspects, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, register files, and their method of operation, however, it will be understood by those skilled in the art that different and numerous embodiments of the computer system, computer architectural structure, register files, and their method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of registers. It may be noted that a numbered element is numbered according to the figure in which the element is introduced, and is typically referred to by that number throughout succeeding figures.

Figure 1:
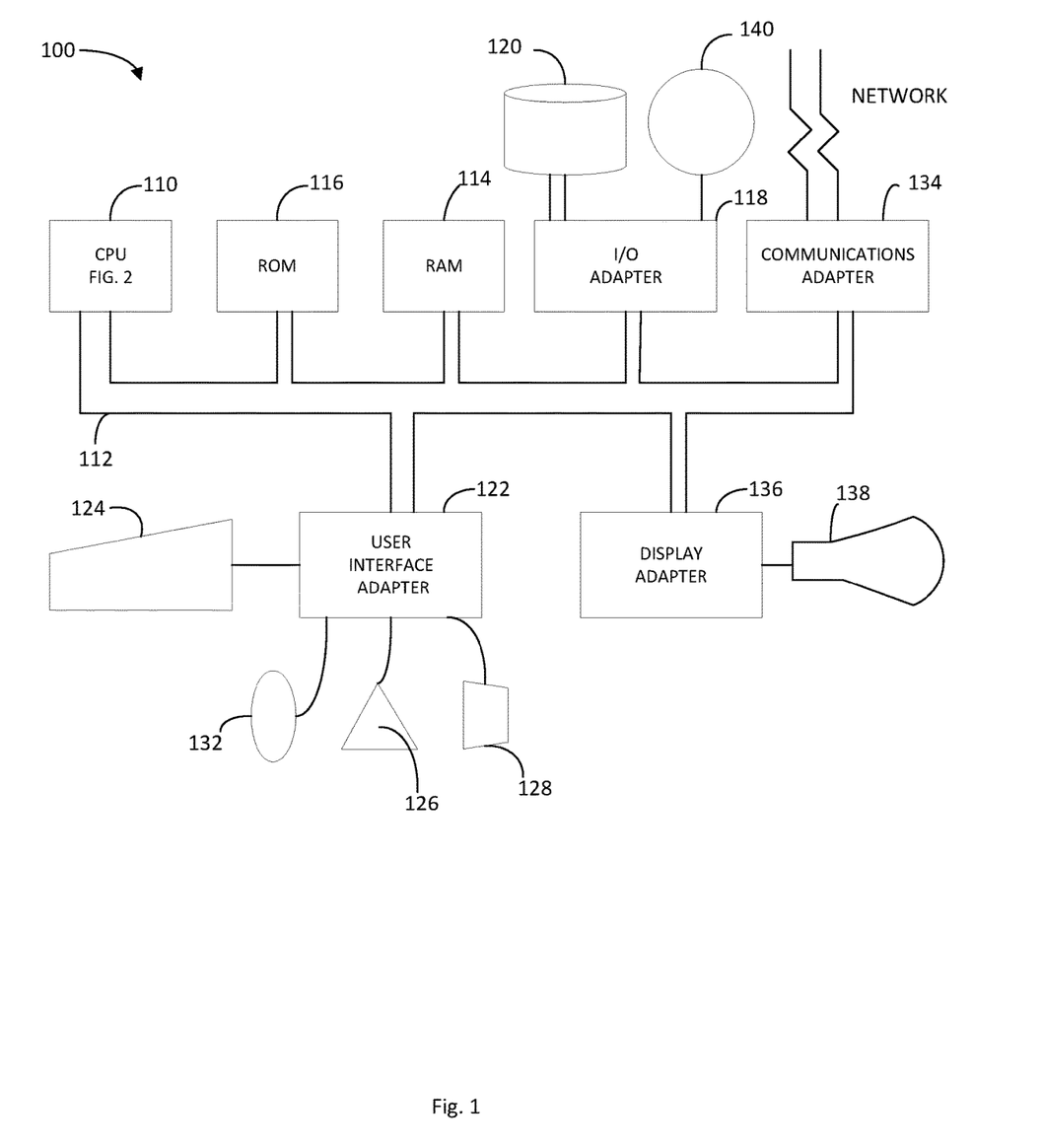
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
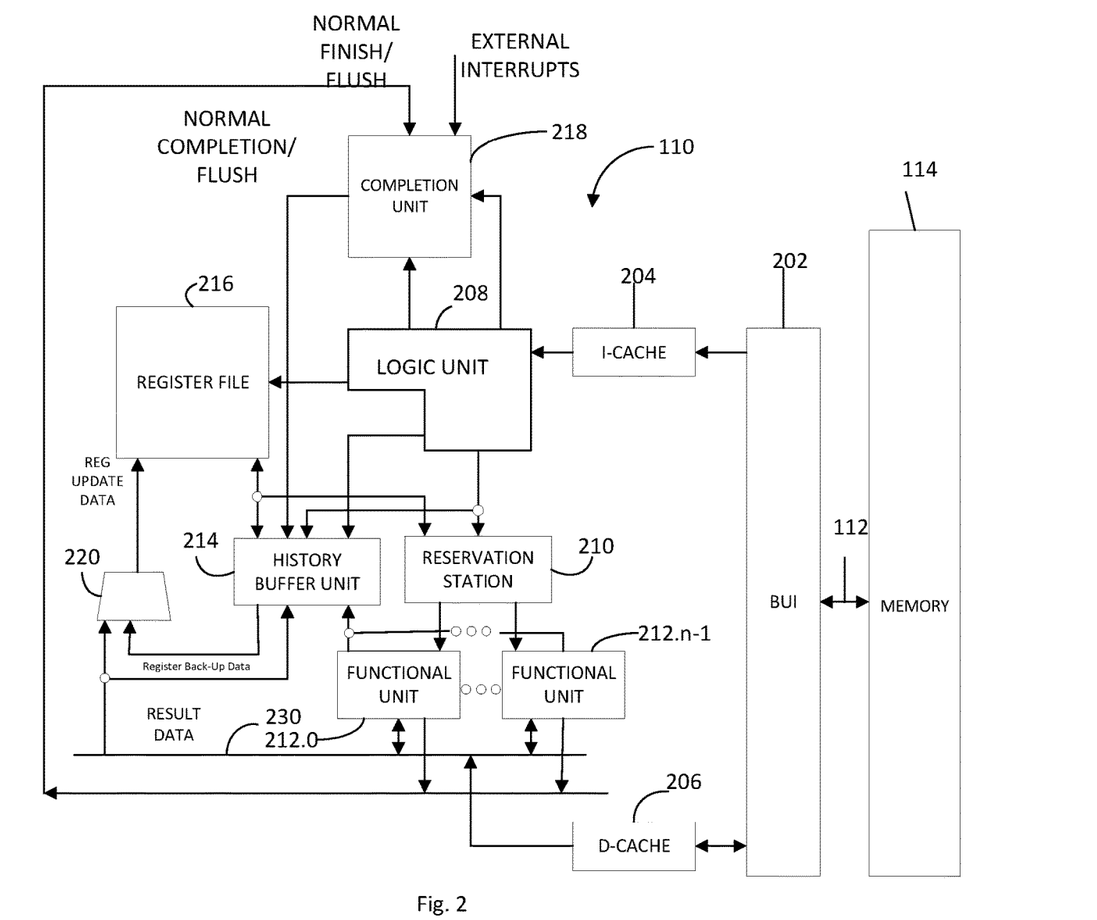
FIG. 2 illustrates a block diagram of a processor in which certain aspects of the present disclosure may be practiced.

FIG. 2 illustrates a block diagram of a processor 110 in which certain aspects of the present disclosure may be practiced. Processor 110 has a bus interface unit 202 coupled to the bus 112 for controlling transfers of data and instructions between memory, such as random access memory 114, and caches, e.g. instruction cache (I-Cache) 204 and data cache (D-Cache) 206.

Instructions may be processed in the processor 110 in a sequence of logical, pipelined stages. However, it should be understood that the functions of these stages, may be merged together, so that this particular division of stages should not be taken as a limitation, unless such a limitation is indicated in the claims herein. Indeed, some of the previously described stages are indicated as a single logic unit 208 in FIG. 2 for the sake of simplicity of understanding and because each distinction between stages is not necessarily central or relevant to the present invention.

Logic unit 208 in FIG. 2 includes fetch, branch processing, instruction buffer, decode and dispatch units. The logic unit 208 fetches instructions from instruction cache 204 into the instruction buffer, either based on a normal sequence of the instructions or, in the case of a sequence having a conditional branch instruction, a predicted sequence, the predicted sequence being in accordance with addresses selected by the branch processing unit. The logic unit 208 also decodes the instructions and dispatches them to an appropriate functional unit (e.g., execution unit) 212.0, 212.1, . . . 212.n-1 via reservation station 210. In executing the instructions, the functional units 212 input and output information to registers (shown collectively as register file 216). The functional units 212 signal the completion unit 218 upon execution of instructions and the completion unit 218 retires the instructions, which includes notifying history buffer (HB) logic 214. The history buffer (HB) may save a processor state before, for example, an interruptible instruction, so that if an interrupt occurs, HB control logic may recover the processor state to the interrupt point by restoring the content of registers. In an aspect, functional units 212 also assert results on one or more result buses (e.g. write back buses) 230 so that the results may be written to the registers in the register file 216. In addition to notifying the HB logic unit 214 about retired instructions, the completion unit 218 or logic unit 208 may also notify the HB unit 214 about exception conditions and mispredicted branches for which instructions should be discarded prior to completion, and for which the HB unit 214 should recover a state of the processor 110.

In certain aspects, a CPU 110 may have multiple execution/processing slices with each slice having one or more of the units shown in FIG. 2. For example, each processing slice may have its own logic unit 208, register file 216, history buffer 214, reservation station 210 and functional/execution units 212. A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Each processing slice may be an independent processor (e.g., processor 110) and may execute instructions independently of other processing slices in the multi-slice processor.

Figure 3:
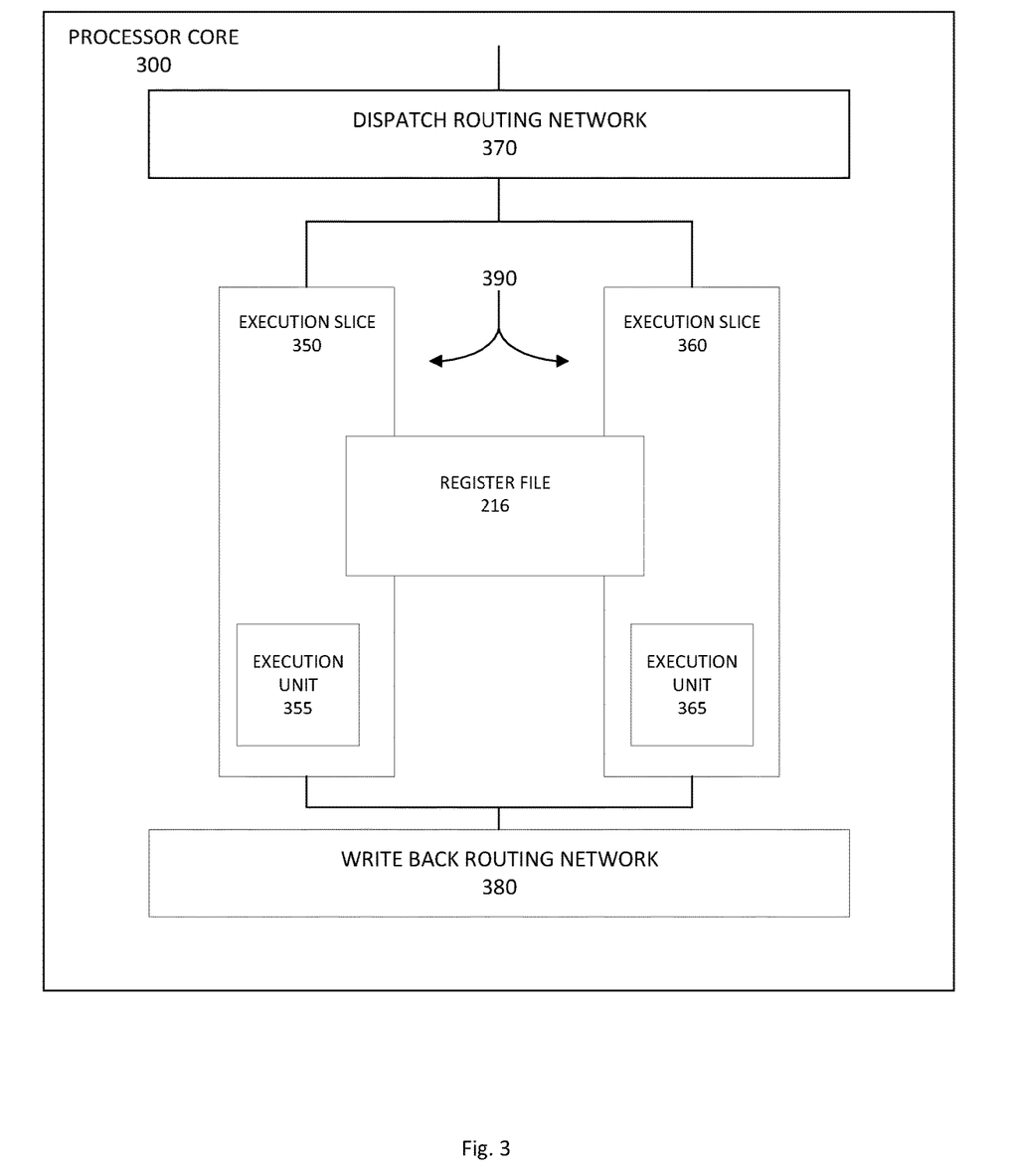
FIG. 3 illustrates a block diagram of a super execution slice in accordance with an aspect of the present invention.

FIG. 3 shows a simplified block diagram of an exemplary processor core 300 configured with two execution slices 350 and 360. The processor core may include dispatch routing network 370, execution slices 350 and 360, and write back routing network 380. The two execution slices 350 and 360 may be grouped into a super slice 390. The processor core may include other circuits, functional units, and components. At the designated time, the dispatch routing network 370 may dispatch a given instruction to the designated instruction slice, e.g., slice 350 or slice 360. The designated execution slice 350 or 360 may then process the instruction. Once processed, the result of the instruction may be transferred through write back routing network 380, and written to registers within the register file 216.

The execution unit 355 may perform the operation specified by an instruction dispatched to execution slice 350. The register file 216 may serve to store data to be used in an operation specified in an instruction dispatched to execution slice 350, and the result of the operation performed by execution unit 355 may be written to the designated target register in register file 216. Similarly, the execution unit 365 may perform the operation specified by an instruction dispatched to execution slice 360. The register file 216 may serve to store data to be used in an operation specified in an instruction dispatched to execution slice 360, and the result of the operation performed by execution unit 365 may be written to the designated target register in register file 216. Execution units 355 and 365 may include, for example, one or more load store units (LSU), and/or vector scalar units (VSU). Execution units 355 and 365 may also include, for example, one or more arithmetic logic units (ALU), a fixed point unit (FXU), a floating point unit (FPU), a vector multimedia unit (VMU), and/or a permutation unit (PERM), as well as other functional and execution units.

Figure 4:
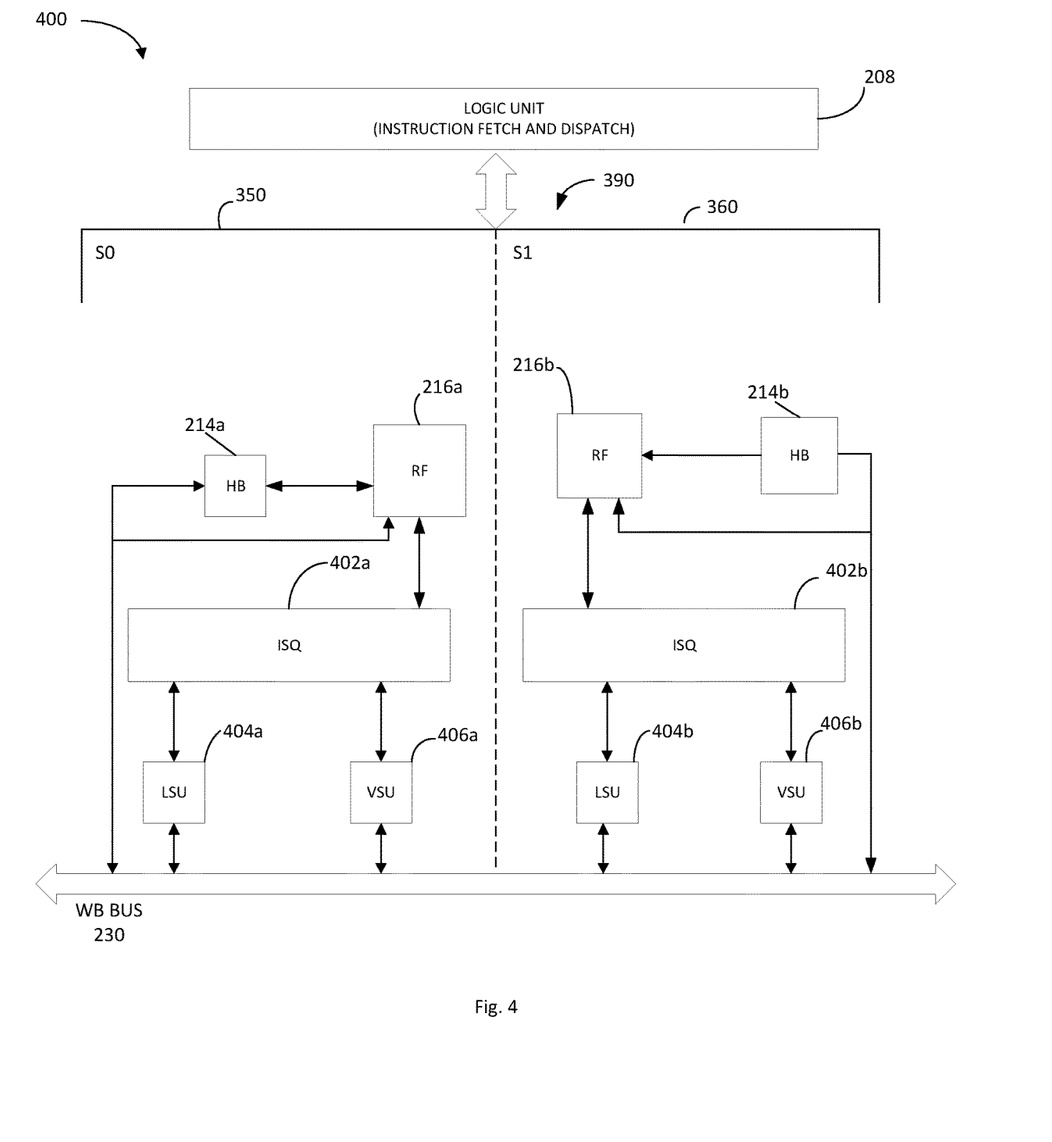
FIG. 4 illustrates a multi-slice processor in accordance with certain aspects of the present disclosure.

FIG. 4 illustrates a diagram of a multi-slice processor 400 in accordance with an embodiment of the present disclosure. It may be noted that FIG. 4 only shows portions of the multi-slice processor 300 in diagrammatic fashion for purpose of discussion. It will be appreciated that the multi-slice processor may have other configurations. As shown in FIG. 4, the multi-slice processor 400 includes two processing slices-Slice 0 (slice S0 or 350) and Slice 1 (slice S1 or 360). Each of the slices S0 and S1 includes an issue queue (ISQ) (402a and 402b), execution units including a load store unit (LSU) (404a and 404b), a vector scalar unit (VSU) (406a and 406b), a register file (RF) (216a and 216b), and a history buffer (HB) (214a and 214b).

As shown, logic unit 208 may perform instruction fetch and dispatch for the multi-slice processor. In an aspect, the slices S0 and S1 (slices 350, 360) may share one physical register file 216 having an array of general purpose registers (GPRs). A physical register may be used to identify a structural, hardware storage device that may be part of the processor core architecture. A register may be used for staging data between memory and other functional units in the processor. Register files may also be used for storing architectural state, speculative state, or simply state information. There may be numerous register files and types. For example, there may be general purpose registers, condition or status registers and other register types. In certain aspects, the ISQ 402 holds a set of instructions and the register file accumulates data for the instruction inputs. When an instruction is dispatched, the ISQ 402 may allocate a register file (RF) entry for the instruction. The source RF entries required as input for the instruction are looked up and passed on to the appropriate register file, e.g., general purpose register (GPR). When all source data accumulates for the instruction, the data is passed on to one or more execution units designated for execution of the instruction. Each of the LSUs 404 and VSUs 406 may make result data available on the write back buses 230 for writing into an RF entry or HB entry. In an aspect each of the LSUs 404 and VSUs 406 may have a corresponding WB bus 230.

It may be noted that the two slices are shown for ease of illustration and discussion only, and that multi-slice processor 400 may include more than two processing or execution slices with each slice having all the components discussed above for each of the slices S0 and S1 (slices 350 and 360). Further, the processing slices may be grouped into super slices (SS 390), with each super slice including a pair of processing slices. For example, a multi-slice processor may include two super slices SS0 and SS1, with SS0 including slices S0 and S1, and SS1 including slices S2 and S3. In an aspect, one register file 216 may be allocated per super slice and shared by the processing slices of the super slice. In one aspect, one register file 216 may be allocated to more than one super slice and shared by the processing slices of the super slices. For example, slices S0, S1, S2, and S3 may be allocated to share one register file. In another aspect, each execution/processing slice may have its own register file.

In certain aspects, the slices S0 and S1 of the multi-slice processor 400 may be configured to simultaneously execute independent threads (e.g., one thread per slice) in a simultaneous multi-threading mode (SMT). Thus, multiple threads may be simultaneously executed by the multi-slice processor 400. For example, in a multi thread mode, threads T0 and T1 may execute in SS0 and threads T2 and T3 may execute in SS1. Further, in a single thread (ST) mode, instructions associated with a single thread may be executed simultaneously by the multiple processing slices of at least one super slice, for example, one instruction per slice simultaneously in one processing cycle. Simultaneous processing in the multiple slices may considerably increase processing speed of the multi-slice processor 400.

In embodiments, a processing slice may have multiple registers, including general purpose registers (GPR), condition registers and other register files. In certain aspects, each register file may include a number of RF entries or storage locations. For example, a general purpose register (GPR) file may have 320 or 640 RF entries. The GPR file may contain more or less than 320 or 640 RF entries. In an aspect, the RF entry of the GPR may store bit data and/or control bits. The processor slice also may include a condition register. In an embodiment, the condition register stores status information, for example, status information about the results or state of an instruction.

Figure 5:
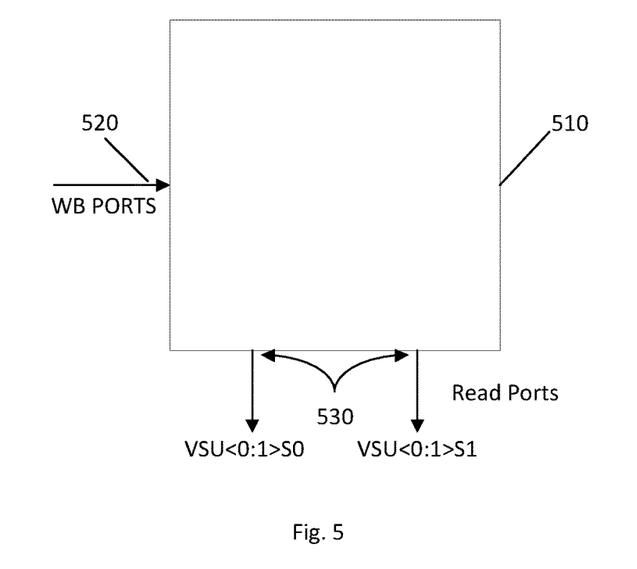
FIG. 5 illustrates a register file.

FIG. 5 shows a block diagram of condition register 510. Condition register file 510 has one or more write back ports 520 and one or more read ports 530. In an embodiment, condition register 510 has four write ports 520 and four read ports 530. In FIG. 5, condition register 510 is used for two processing or execution slices S0 and S1 (a super slice) of the processor core. The four (4) read ports 530 in the embodiment of FIG. 5 is associated with, e.g., connected to, two execution units. One execution unit, for example, a vector scalar unit (VSU), may be utilized for each execution slice. Other execution or functional units may be used in addition to or alternatively to the VSU. In an embodiment, condition register 510 has two read ports 530 for slice S0 and two read ports 530 for slice S1.

Figure 6:
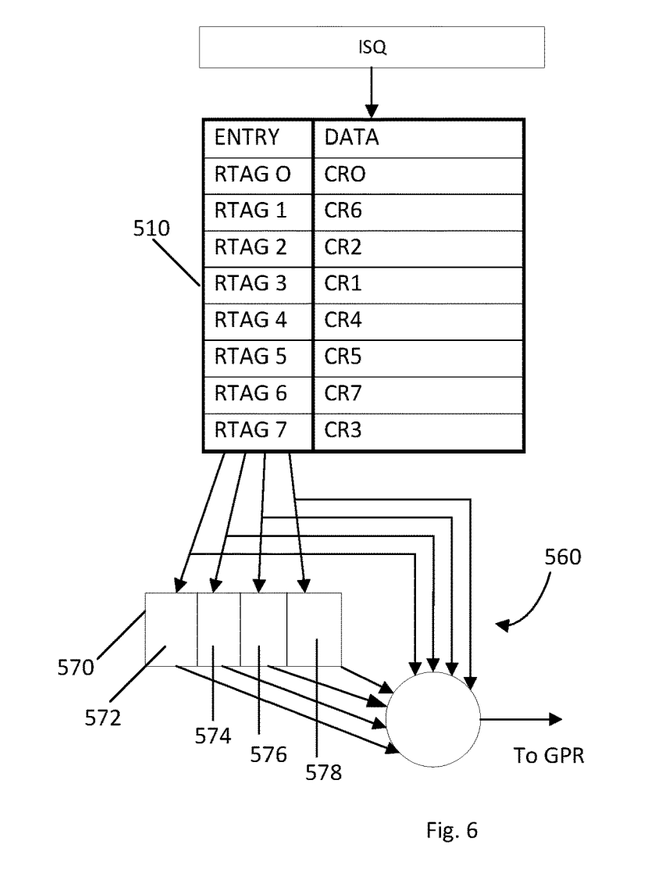
FIG. 6 illustrates a diagram of a condition register and execution area in accordance with an aspect of the invention.

FIG. 6 shows a block diagram of an embodiment of a condition register 510 and execution area 560, e.g., an MFCR execution area, in a processor. Condition register 510 has numerous locations (registers or entries) for data (e.g., status information). Condition register 510 may have, for example, up to thirty-two (32) entries, but may have more or less register entries. In the embodiment of FIG. 6, condition register 510 has eight (8) register entries. Each condition register entry may contain a number of bits which may vary depending upon the design of the condition register. In the embodiment of FIG. 6, the register entries are thirty-two (32) bits wide. Other widths for the register entries are contemplated, e.g., 64, 72, 96 and others. Each entry in condition register 510 has a different name or tag, e.g., RTAG 0, RTAG 1, RTAG 2, RTAG 3, RTAG 4, RTAG 5, RTAG 6, and RTAG 7 as illustrated in FIG. 6. Each name or entry, e.g., RTAG, is associated or mapped to a physical location in the register file, and data is stored at that location. As the processor executes operations and instructions, the entry names and mapped locations change. Accordingly, different data, e.g., CR0, CR1, CR2, CR3, CR4, CR5, CR6, and CR7, is placed and stored in different locations in the condition register and identified by different identifiers or names, e.g. RTAG. CR0-CR7 may correspond to fields (parts) of a complete register.

In circumstances, it may be required to move or read out the entire data content of condition register 510. Depending upon the number of read ports and configuration of the condition register, such an operation may take multiple cycles to complete. The more cycles it takes to read out the data, the less efficient the processor, the slower the processor, and more energy is consumed by the processor.

Disclosed is a process and architecture to reduce the number of cycles, and number of ISQ entries, required to execute a move from condition register (mfCR) instruction, and thus increase efficiency and speed, and potentially reduce energy consumption, of the processor. In an embodiment, the new overloaded read from the condition register allows the move to occur in two cycles. The new overloaded mfCR process in an embodiment reduces the time of execution and number of issue queue (ISQ) entries required to execute the operation. In an embodiment, the instruction sequencing unit fuses the two issue queue (ISQ) entries together so that they will issue back-to-back to the same execution unit, and in an aspect to the same issue port.

FIG. 6 illustrates a sample register file 510, e.g., condition or status register, with each of the eight fields contained in a different entry in the register file. So, in the embodiment of the example of FIG. 6, entry RTAG 0 contains data pertaining to field CR0; RTAG 1 contains data pertaining to field CR6; RTAG 2 contains data pertaining to field CR2, etc. FIG. 6 shows the execution area 560, e.g., MFCR instruction execution area, with a staging latch 570 to store data from the condition register between cycles. The staging 570 latch in an embodiment is a scratch latch. In the example, of FIG. 6, the staging latch 570 has four (4) fields that are each four (4) bits wide. For example, each of fields 572, 574, 576 and 578 are four (4) bits wide. The staging latch 570 store be larger or smaller than sixteen (16) bits. The staging latch 570 may be divided into more or less fields, and each field may be larger or smaller than four (4) bits. The condition register has four ports, and the data, e.g., status data CR0-CR7, in an embodiment of the condition register 510 is contained in eight (8) separate entries, each entry having the data contained in a four (4) bit field.

Figure 7:
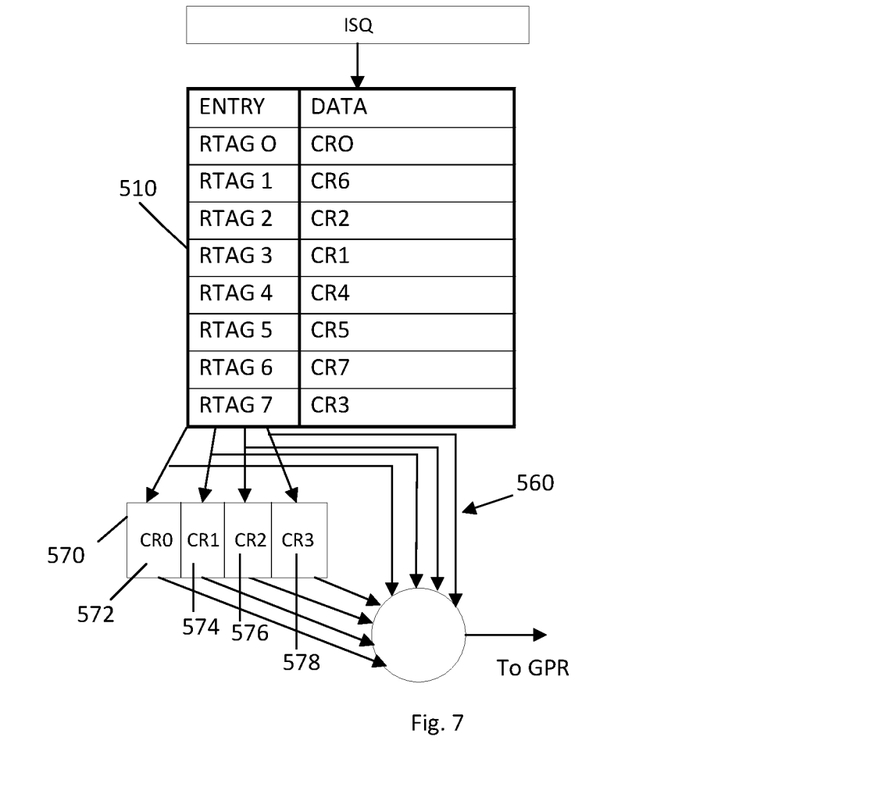
FIG. 7 illustrates a condition register and execution area during a first cycle of a move instruction in accordance with an aspect of the present invention.

FIG. 7 shows an embodiment of the first cycle of an instruction (mfCR) to move or read the entire contents of the condition register 510 out of the condition register. The contents of condition register may be sent to a number of targets or destinations, but in the example of FIGS. 7 and 8 the data is sent to a general purpose register (GPR). In the first cycle, the first four sources are read out into execution area 560, and specifically are stored in staging latch 570. Staging latch 570 may, in an example, be a scratch latch.

Figure 8:
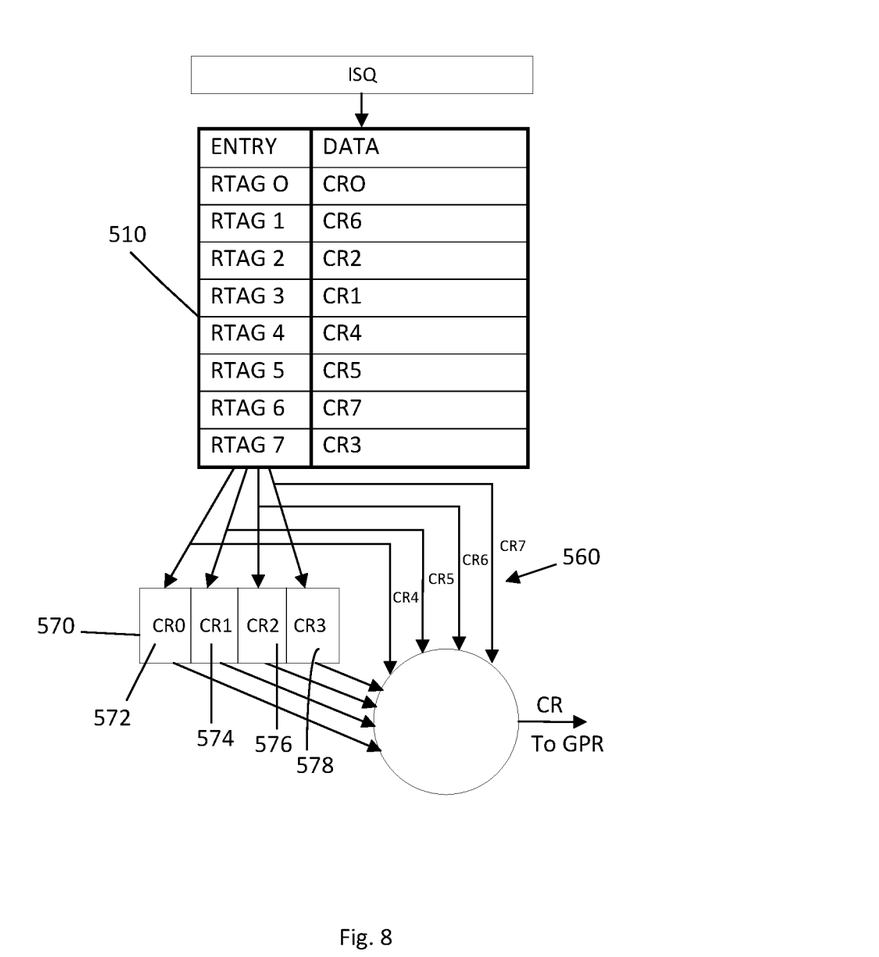
FIG. 8 illustrates a condition register and execution area during a second cycle of a move instruction in accordance with an aspect of the present invention.

In the example of FIGS. 7 and 8, the processor, for example, processes an instruction to read out or move all the contents of the condition register 510 to a different register, e.g., a general purpose register. The issue queue (ISQ) issues or dispatches an instruction to read out source data from the condition register, and in an embodiment, issues an instruction to read out source data into the staging latch 570. In an aspect, the instruction or process to move the contents of the condition register may be parsed into two or more instructions, including in an embodiment, a first instruction I0 to process data in a number of registers in a first cycle, and a second instruction I1 to process data in a number of registers, e.g., the remaining registers, in a second cycle. In an embodiment, the Instruction Sequencing Unit (ISU) fuses the two instructions I0 and I1 together so that they issue back-to-back to the same execution unit, and in an aspect to the same issue port. For example, in the embodiment of FIG. 7, an instruction I0 issues to read the data from the fields CR0-CR3, and in one cycle all four fields CR0-CR3 are read out of the condition register. Another instruction I1 in the embodiment of FIG. 8, issues to read data from the fields CR4-CR7, and in the second cycle all four fields CR4-CR7 are read out of the condition register.

In an aspect, the data is read out of the condition register 510 and stored in staging latch 570 in a first cycle. In an example, data is read out of condition register 510 in a second cycle. In an embodiment, the data from the second cycle is combined with the data in the staging latch. In an embodiment, source data is read out of each read port on the condition register, and in the embodiments of FIGS. 7 and 8, condition register reads data out of all four read ports 530 during a first cycle, and reads data out of all four read ports 530 in a second cycle.

In the example of FIG. 7, data CR0 is mapped and associated with RTAG 0 and the data CR0 in the register associated with RTAG 0 is read out of first read port 532 and placed in field 572 in staging latch 570. The same instruction I0 requires CR1 to be read/moved and the data CR1 which is mapped and associated with RTAG 3 is read out of the second read port 534 and stored in field 574 of staging latch 570. The same instruction I0 requires CR2 to be read/moved and the data CR2 is mapped to RTAG 2 so that the data located in the condition register 510 corresponding to RTAG 2 is read out of the third read port 536 and stored in field 576 of staging latch 570. The same instruction I0 requires CR3 to be read/moved and the data CR3 is mapped to RTAG 7 so that the data located in the condition register 510 corresponding to RTAG 7 is read out of the fourth read port 538 and stored in field 578 of the staging latch 570.

The issue queue (ISQ) issues a second instruction I1 to read out source data from the condition register. The second instruction, in an aspect, is fused or coupled with the first instruction so that the second instruction issues immediately following the first instruction. In an embodiment, the second instruction issues to the same execution unit that has the staged data, e.g., the data stored in the staging latch 570 in the execution area 560. The execution unit, depending upon the design of the processor may be served by multiple ports from the issue queue (ISQ). In an embodiment, source data is read from each port available on the condition register. In an embodiment, the source data read in a second cycle is combined with the data from the previous cycle and sent to a target or destination location. The target or destination location in an embodiment is a general purpose register (GPR), although other targets and destinations are contemplated. In an embodiment, the entire condition register, e.g., eight fields of four bits—thirty-two bits in total, may be moved in two cycles. In an embodiment, each and every read port of the condition register is used in each cycle to complete the move from condition register (mfCR) instruction.

In the example of FIG. 8, the second instruction issues to read the data from fields CR4-CR7, and in one cycle all four fields CR4-CR7 are read out of the condition register. In the example illustrated in FIG. 8, the second instruction I1 requires data CR4 to be read. The field CR4 is mapped to and associated with RTAG 4 and RTAG 4 is associated with a location on the condition register 510 so the data residing at the location associated with RTAG 4 is read out of first port 532. The same instruction I1 requires CR5 to be read/moved and the data CR5 is mapped to RTAG 5 so that the data located in the condition register 510 corresponding to RTAG 5 is read out of the second read port 534 in the second cycle.

The same instruction I1 requires CR6 to be read/moved and the data CR6 is mapped to RTAG 1 so that the data located in the condition register 510 corresponding to RTAG 1 is read out of the third read port 536 in the second cycle.

The same instruction I1 requires CR7 to be read/moved and the data CR7 is mapped to RTAG 6 so that the data located in the condition register 510 corresponding to RTAG 6 is read out of the fourth read part 538 in the second cycle. In the examples of FIGS. 7 and 8, the entire register file, e.g., eight field of four bits, is moved in two cycles.

In an embodiment, the data read out of read ports 532, 534, 536, and 538 in the second cycle are combined with the data from the first cycle that was stored in the staging latch 570, and all the contents of the eight register entries are pieced together or combined in the execution area 560. In this manner, each and every read port on the condition register is used in each cycle to read data from a condition register during a move from condition register (mfCR) instruction. The first half of the fields of the condition register, e.g., the first four fields in the example of FIGS. 6-8, are read in the first instruction and held in a scratch latch. The remaining half of the fields of the condition register are read out in the second instruction that immediately follows the first instruction, and the result is pieced together and combined by the MFCR execution area. The combined data CR is sent to a target or destination. In an embodiment, the combined data is sent to a target GPR.

Figure 9:
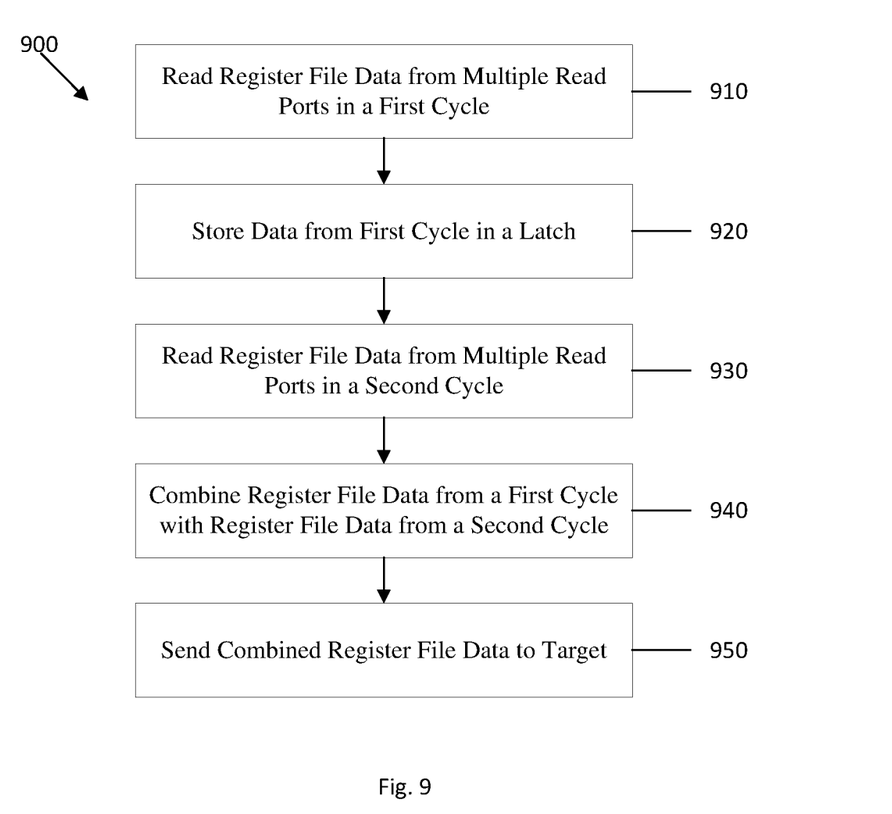
FIG. 9 is a flow diagram of a method according to an embodiment for moving the contents of a condition register.

FIG. 9 is an exemplary flowchart in accordance with one embodiment illustrating and describing a method of moving the contents of a condition register in accordance with an embodiment of the present disclosure. While the migration method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9, but the process may be integrated and/or one or more steps may be performed together, simultaneously, or the steps may be performed in the order disclosed or in an alternate order.

While the illustrative embodiments described above are preferably implemented in hardware, such as in units and circuitry of a processor, various aspects of the illustrative embodiments may be implemented in software as well. For example, it will be understood that each block of the flowchart illustration in FIG. 9, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

In FIG. 9, at 910, register file data is read from multiple read ports of a register file in a first cycle. In an embodiment, each and every read port of the register file is read during the first cycle. In other embodiments, not every read port, but preferably multiple read ports, are read during a first cycle. In an embodiment, a condition register has four read ports and data is processed by each read port in a first cycle. At 920, data from a first read cycle in a register file is stored in a staging latch. The staging latch in an embodiment is a scratch latch.

In an embodiment, the staging latch stores four (4) fields of data, and in an aspect each of the fields is four (4) bits. Register file data, at 930, is read from multiple read ports in a second cycle of the processing unit. In an embodiment, a condition register has four read ports and data is processed by each read port in the second cycle. In an embodiment, register file data from a first cycle is combined with register file data from a second cycle at 940. In an embodiment, register file data stored in a staging latch is combined with register data from a second cycle preferably in an execution area. In an embodiment, the data from the second cycle includes four fields, each of four bits, and that data is combined with the data of the first cycle. In an embodiment the combined data is thirty-two bits, but other widths of combined data are contemplated. At 950, the combined register data is sent to a target or destination. In an embodiment, the combined register data from the first cycle and the second cycle is sent to a target. In an embodiment, the target for the combined data is a general purpose register. Other target destinations are contemplated by the disclosure.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of processing data in a processor, comprising:
   reading, from a register file having a plurality of entries for storing register file data, register file data from a first set of the plurality of register file entries from multiple read ports in a first cycle;
   storing data from the first cycle read into a staging latch;
   reading register file data from a second set of the plurality of register file entries from the multiple read ports in a second cycle; and
   combining the register file data stored in the staging latch from the first cycle with the register file data read from the second set of the plurality of register file entries read during the second cycle to form combined register file data, wherein all the register file entries in the register file are read in two cycles.

2. The method according to claim 1, further comprising sending the combined register file data to a target register file different than the register file.

3. The method according to claim 1, wherein the register file is a condition register file having a plurality of entries containing status information, the condition register file having four read ports which serve at least two separate execution slices.

4. The method according to claim 2, wherein the register file is a condition register file, each register file entry has a single field that can hold data that is four bits, the staging latch is a scratch latch, the target register file is a general purpose register, and all the register file entries in the condition register file are read in two cycles.

5. The method according to claim 1, wherein four read ports are read in a first cycle and four read ports are read in a second cycle.

6. The method according to claim 1, wherein the register file is a condition register file that contains status information, and the method further comprises coupling multiple read instructions together so that the instructions issue back-to-back to a same execution unit.

7. The method of claim 1, further comprising, in response to receiving an instruction to read out the entire contents of the register file, parsing out the instruction into multiple instructions; and issuing the multiple instructions back-to-back each to a same execution unit.

8. The method of claim 1, wherein the register file data from each register file entry in the first set of register file entries is read from a single, different read port during the first cycle.

9. A computer system for processing information, the computer system comprising:
   at least one computer processor;
   a register file associated with the at least one processor, the register file having multiple entries for storing data, the register file having multiple ports to write data to the register file and multiple ports to read data from the register file; and
   a staging latch to store data from a first cycle read operation,
   wherein the processor is configured to read all entries from the register file in two cycles including reading a first set of the multiple entries in the register file from all the read ports in the first cycle, and reading a second set of the multiple entries of the register file from all the read ports in a second cycle, and
   wherein the processor is configured to:
   in response to receiving an instruction to read out the entire contents of the register file, parse out the instruction into multiple instructions; and issue the multiple instructions back-to-back each to a same execution unit; and
   store data from the first cycle read operation in the staging latch.

10. The computer system of claim 9, wherein the computer system is configured to combine the data stored in the staging latch during a first read cycle with the data read from the second cycle to form combined data.

11. The computer system of claim 10, wherein the combined data is sent directly to a target general purpose register file.

12. The computer system of claim 9, wherein the register file is a condition register file which contains status information, each register file entry can hold information that is four bits, the staging latch is a scratch latch, and the condition register file has four read ports, and four read ports are read in a first cycle and four read ports are read in a second cycle.

13. The computer system of claim 10, wherein the register file is a condition register file having eight entries containing status data and four read ports, and the first cycle reads data from four entries of the condition register file into four fields in the staging latch, and the second cycle reads data from the remaining four entries of the condition register file, and wherein the combined data is sent to a general purpose register.

14. The system of claim 9, wherein each entry in the register file has a single field for holding data.

15. A computer system for processing information, the computer system comprising:
   at least one processor;
   a register file associated with the at least one processor, the register file having multiple entries for storing data, the register file having multiple ports to write data to the register file and multiple ports to read data from the register file;
   an execution area having a staging latch for storing data;
   one or more computer readable non-transitory storage media; and
   programming instructions stored on the one or more computer readable non-transitory storage media for execution by the at least one processor, the programming instructions comprising:
   programming instructions to read register file data from a first set of the multiple entries of the register file from multiple read ports in a first cycle, wherein the register file data read from each of the first set of multiple entries during the first cycle is read from a single, different read port;
   programming instructions to read all register files entries from the register file in two cycles;
   programming instructions to store data read from the first cycle into the staging latch; and
   programming instructions to combine in an execution area register read data from the staging latch with register data read from a second set of register file entries in a second cycle to form combined data.

16. The computer system of claim 15, further comprising program instructions to read register file data from a second set of multiple entries of the register file from multiple read ports during a second cycle, wherein the register file data read from each of the second set of multiple entries during the second cycle is read from a single, different read port.

17. The computer system of claim 15, wherein the register file is a condition register file that contains status information and each condition register file entry has a field that can hold up to four bits of data and the staging latch is a scratch latch, the system further comprising program instructions to read register file data from all read ports in the register file in the first cycle and to read data from all read ports in the register file in a second cycle.

18. The computer system of claim 6, wherein the register file is a condition register file that stores status information, the staging latch is a scratch latch, and the processor further comprises programming instructions to treat an instruction to move all the contents of the condition register file as multiple read instructions coupled together so that they issue back-to-back to a same execution unit.

* * * * *